Patented May 2, 1933

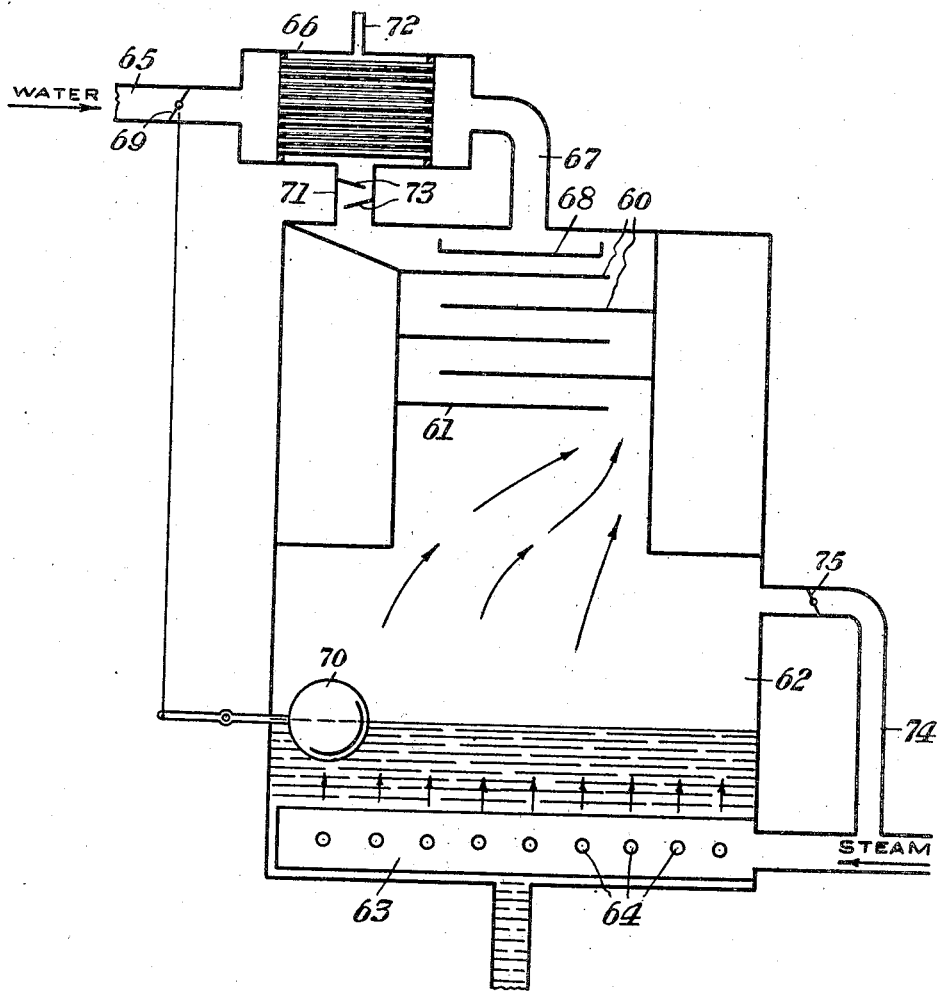

1,907,050

UNITED STATES PATENT OFFICE

WILLIAM S. ELLIOTT, OF PITTSBURGH, PENNSYLVANIA

METHOD AND APPARATUS FOR REMOVING AIR FROM LIQUIDS

Application filed October 2, 1930. Serial No. 486,197.

The present invention relates broadly to the art of deaeration, and more particularly to an improved method and apparatus effective for the removal of air from water for the purpose of rendering available a continuous supply of deaerated water as required by demands, for example, of a modern power plant or the like.

In effecting the commercial deaeration of water it is desirable to provide a method and apparatus inherently capable of taking advantage of the laws of Henry and Dalton with respect to partial pressures and the solubility of gases in liquids. Dalton's law is to the effect that the pressure of gases and vapors exists approximately independently in a mixture. In other words, each gas in a mixture exerts its own partial pressure independently of the other gases, the total pressure being equal to the combined partial pressures of the various gases present. The law of Henry is to the effect that the gases, including the air and its constituents, dissolve in water in proportion to their partial pressures at the surface of the water or in contact therewith.

Since each constituent of a gas and vapor mixture is capable of exerting its own partial pressure, and since this partial pressure determines the solubility of such constituent in a liquid, it is now commercial practice to provide deaerating apparatus in which effective means is provided for venting the air therefrom, whereby the partial pressure of the air component of the mixture in the apparatus is kept as small as possible, and the solubility of air correspondingly reduced. The ideal conditions of deaeration are only obtainable where the total pressure existing in the atmosphere in contact with the water is substantially the partial pressure of the steam, such a condition necessarily resulting in a substantially air-free atmosphere.

The obtaining of the desired conditions commercially involves a considerable problem since any operation accompanied by heating, where the water being heated and the steam which accomplishes the heating are in contact unavoidably results in the condensation of steam and the consequent increase in the non-condensable component thereof, which is air. It therefore necessarily follows that a good heater by virtue of its heating properties is a poor deaerator. The problem encountered commercially therefore is to effect such a modification of a true heating operation as to enable the continuous production of deaerated water at the desired temperatures.

For this purpose there are available as commercial units three different specific embodiments of apparatus each of which, while operating in accordance with its own individual constructional characteristics, all involve a generic principle of operation resulting in the production of a common result. These different forms of apparatus will be hereinafter referred to as the combination induction-thoroughfare or tray type deaerator, the flash type deaerator and the reboiler type deaerator. Each of these types embodies a heating stage and a deaerating stage. Inasmuch as the heating stage possesses limitations of the character referred to with respect to deaerating ability, each heating stage is constructed from the standpoint of efficient heating regardless of deaerating properties. Such stage in turn delivers its heated water to the deaerating stage which is characterized by bringing the air component of the water into equilibrium with the partial pressure of the air component in the atmosphere in contact therewith, and maintaining the air component in the atmosphere substantially negligible. The deaerating stage therefore may be referred to as a pressure stage inasmuch as its main function is a pressure equalizing operation.

It is obvious that in order to maintain a substantially air free atmosphere in the pressure stage, it is necessary to continuously withdraw the atmosphere therefrom and continuously supply a new substantially pure steam atmosphere, since pure steam represents substantially an air-free mixture. It is not feasible commercially to throw away the heat content of the continuously withdrawn atmosphere, and for purposes of economy this atmosphere must be utilized at least in part as the heating medium for the heating stage.

It has already been pointed out that the heating operation results in air concentration, and in order to keep this air concentration as low as possible in the heater, and thereby enable a water temperature in the heater which is as high as possible and which is limited only by the air content in the heating atmosphere, it is desirable to liberally vent the heating stage. Since liberal venting involves the continuous withdrawal of an appreciable amount of steam, it is further desirable to provide means for recovering the heat of such vented mixture.

Heat recovery of an air-steam mixture is obviously obtainable by means of a heat exchanger which involves condensation of the steam component and thereby the production of condensate. Since this condensate is at an appreciable temperature, it is desirable to continuously reclaim the same. The reclaiming has heretofore been effected by continuously returning the condensate to one of the stages. In my Letters Patent of the United States No. 1,776,019 of September 16, 1930, there is disclosed an apparatus by means of which condensate may be continuously returned to one of the stages at substantially the temperature and pressure of the heat exchanger in which it is produced, such heat exchanger ordinarily being referred to as a condenser. I have found that the continuous condensate return even at approximately the temperature and pressure of the condenser imposes a further heating and deaerating duty on the apparatus, since the condensate itself is characterized by an air content which may be relatively high, the condensate being formed in an atmosphere rich in air. It is one of the objects of the present invention to provide a method of deaeration and deaerating apparatus characterized by the continuous or substantially continuous return of condensate to such apparatus at a temperature and pressure such that the further duty imposed on the apparatus is reduced, and the deaerating properties correspondingly improved.

In the accompanying drawings I have illustrated the invention as applied to each of the three types of deaerating apparatus before referred to, the drawings being more or less diagrammatic for the purpose of facilitating an understanding of the invention. In the drawings:

Figure 3 is a view similar to Figures 1 and 2 illustrating the invention as applied to a reboiler type of apparatus.

Figure 1:
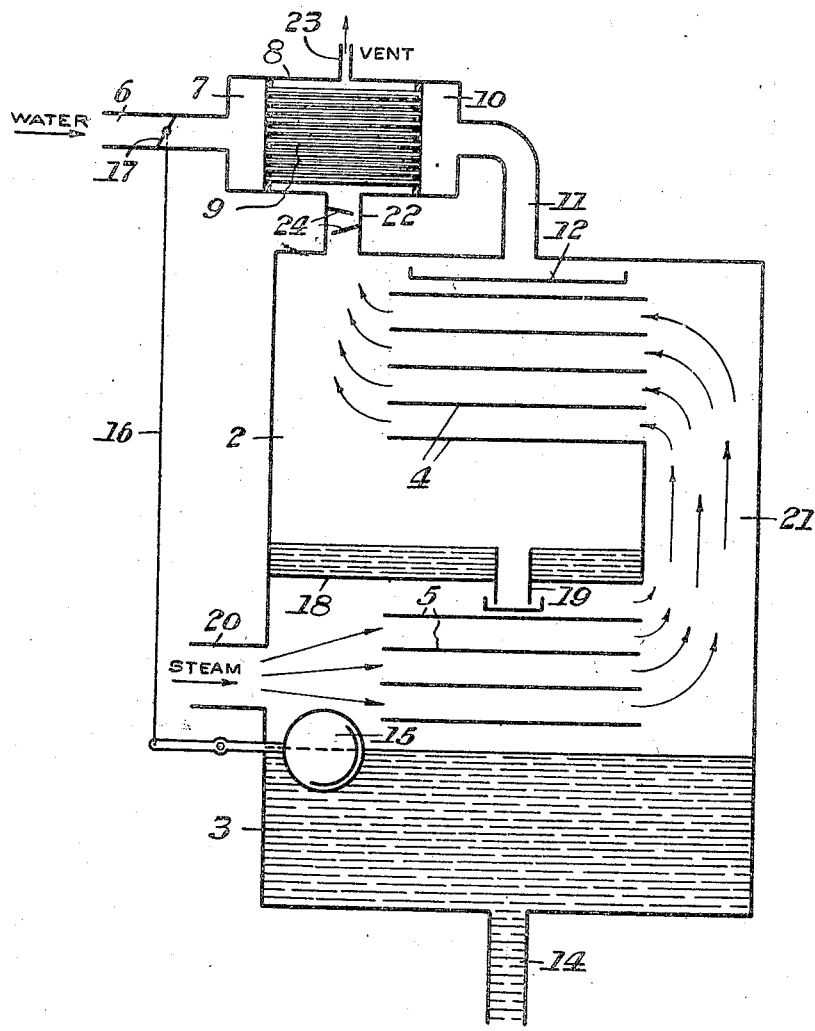
Figure 1 is a diagrammatic sectional view of a tray type apparatus embodying the present invention.

In accordance with the embodiment of the invention illustrated in Figure 1, there is provided a deaerator including a heating stage 2 and a pressure stage 3. Provided in each of these stages is a suitable number and arrangement of trays 4 and 5 respectively which may be referred to as heating trays and deaerating trays.

For delivering to the apparatus the water to be deaerated there may be provided a suitable water connection 6 communicating with a header 7 of a heat exchanger in the form of a vent condenser 8. This water is conducted from the header 7 through the tubes 9 into a header 10 which in turn communicates with a connection 11 for delivering water to a trough 12 over which it is continuously spilled in more or less broken up condition onto the heating trays 4.

Leading from the pressure stage is a deaerated water outlet 14 which is obviously extended to any desired point of use (not shown) and effective for maintaining the deaerated water out of contact with the atmosphere and thereby preventing air re-absorption prior to use. Since it is always desirable to supply water in accordance with the demands, the water level in the pressure stage provides an ideal medium of control, inasmuch as this level fluctuates or tends to fluctuate in accordance with the rate of water withdrawal. I therefore provide a float 15 having an operating connection 16 to a valve 17 in the water supply connection 6. This connection is such that as the level of water in the pressure stage tends to lower, the valve 17 is opened to admit additional water and thereby tend to maintain a substantially constant water level. The supplied water after leaving the trough 12 passes downwardly in broken up condition over the heating trays 4 from which it may be collected on a partition 18 having a suitable opening or openings 19 for discharging the same in a similar manner over the deaerating trays 5.

It will be apparent that the partition 18 may be constructed in the manner diagrammatically illustrated in Figure 1, or that it may comprise a perforated plate constituting a combined partition and bottom tray of the heating tray stack. In any case it serves effectively as dividing means between the heating stage and the deaerating stage.

For effecting the desired heating operations, the deaerating stage is shown as having a steam connection 20 so disposed that the steam therefrom may flow horizontally at high velocity into and through the deaerating stage and through the trays therein, the flow through the trays themselves being characterized by high velocity superimposed steam strata. Having passed through the deaerating stage the steam is collected in a passage 21 disposed laterally of the tray stacks themselves and effective for delivering the steam to the heating stage wherein it passes in a similar manner through the heating trays 4. Upon leaving the heating stage the steam passes through an offtake connection 22 to the vapor space of the vent condenser 8 wherein it is subjected to the cooling influence of the supplied water. In the vent condenser the steam component of the mixture will be condensed and its heat imparted to the incoming water for pre-heating the same, while the air component will be vented to the atmosphere through a suitable vent 23.

The water preheated in the vent condenser will be discharged into the heating stage wherein it will contact with the steam passing thereto from the pressure stage and thus be heated to a temperature as high as water in contact with steam can be heated in the presence of the air content of the heating mixture.

Water at this temperature has a relatively lower air content than the water initially supplied, since the solubility of air in water is a function of temperature. The water at this temperature and with its reduced air content will be passed into the pressure stage wherein it will encounter substantially fresh steam having a minimum air content. The remaining air will immediately pass into the steam to establish pressure equilibrium, as before described, and since this steam is continuously flowing into the heating stage, the deaerating atmosphere is continuously maintained and a substantially fresh steam supply rendered constantly available for the escape of the remaining air. Inasmuch as the water as delivered to the deaerating stage is at approximately the temperature of the steam therein, the steam will only be called upon to effect further heating to the extent represented by the differences in air content. Since this amount of heating is small, the steam condensation in the reaerating stage will be small and this stage is therefore characterized by a substantially through flow of steam, thus providing what is commercially referred to as a thoroughfare heater. Its characteristics are such that by reason of its small heating duty it constitutes an efficient deaerator and an inefficient heater.

The heater 2, on the contrary, is characterized by a steam flow substantially proportional to heating duty, the steam flow being induced in accordance with the water quantity. It is therefore an induction heater characterized by efficient heating and inefficient deaeration. It cooperates with the thoroughfare heater, however, to maintain the air content therein substantially negligible whereby the desired conditions of operation are continuously maintained.

Since the heating stage is called upon to handle not only the air produced by the steam condensation therein, but also the air released in the deaerating stage, it is desirable to make the vent 22 of considerably larger area than is ordinarily the case. This increases correspondingly the amount of condensate formed in the vent condenser. Since, as before stated, the condensate is formed in an atmosphere rich in air, it may have a relatively high air content even though returned to the heating stage at substantially the temperature and pressure of the condenser and therefore must be further heated in the deaerating apparatus with the consequent imposition on such apparatus of an additional duty represented by the amount of reheating required.

To reduce this heating duty, I provide what may be characterized as a jet or contact heater intermediate the vent condenser and the heating stage, this heater being herein illustrated as formed by a suitable number and arrangement of baffles 24 within the offtake 22 whereby the condensate is caused to flow counter current to the vented mixture and in intimate contact therewith. This results in reheating of the condensate and in partial air elimination therefrom so that the condensate returns to the apparatus under such conditions that the additional duty imposed thereon is reduced to a minimum. In other words, by returning the condensate at a temperature higher than condenser temperature and with an air content lower than the air content of condensate such as normally produced therein, I am able to improve the efficiency of the apparatus.

Figure 2:
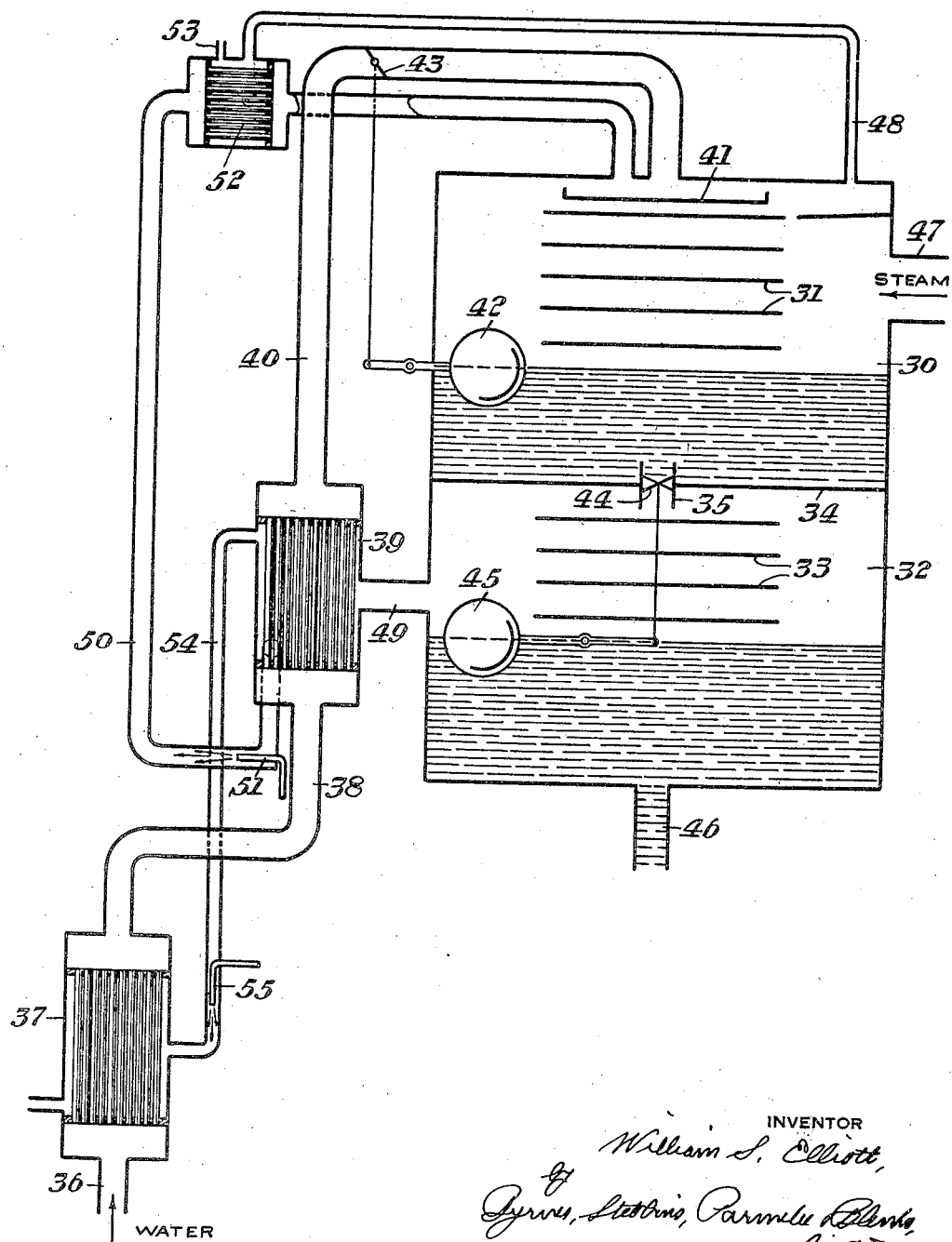
Figure 2 is a view similar to Figure 1 of the flash type of apparatus.

In Figure 2 there is illustrated a flash type apparatus embodying a heating stage 30 having heating trays 31 therein and a deaerating stage 32 having deaerating trays 33. The two stages are separated by a partition 34 having a flow connection 35 corresponding generally to the connection 19 before described. The water to be deaerated is supplied through a connection 36 to an auxiliary condenser 37 and thence through a connection 38 to a vent condenser 39 similar to the condenser 8 before described and delivering through a connection 40 to a trough 41 in the heating stage 30. The flow through this connection is controlled by a float 42 cooperating with a valve 43 in the connection 40 so that the flow varies in accordance with the liquid level in the heating stage. In like manner the flow through the connection 35 is controlled by a float operating valve 44 responsive, by means of a float 45, to the liquid in the deaerating stage. This level in turn varies with demands through the deaerated water outlet 46 as before described.

The heating stage may be supplied with heating steam through a connection 47 and may be provided with a vent 48. Assuming the heater to be operating at atmospheric pressure, the steam supplied may be available for heating the water therein to approximately 208° to 210°. Upon opening the valve 44 this water is permitted to pass into the deaerating stage in which is continuously maintained a vacuum such that the water is heated with respect thereto, and caused to flash at the expense of its contained heat. The vacuum may be such, for example, as to have a corresponding temperature of 190° whereby there is available a flash gradient of from 18° to 20°. This flash causes a portion of the water to change from its liquid phase to its vapor phase, and not only creates an atmosphere into which the air in the water may escape, but is effective for obtaining pressure equilibrium between the air content of the water and the steam produced. This steam is continuously withdrawn into the vent condenser through a connection 49 which, since it receives a water quantity varying with the water being handled, has a capacity varying in like manner and therefore is able to continuously maintain a temperature differential of the character referred to.

The condensate formed in the vent condenser 39 instead of being returned directly to the deaerating stage at substantially the temperature and pressure of the condenser, passes into a connection 50 provided with a steam injector 51 effective not only for heating the condensate to a higher temperature, but for elevating it upwardly through the connection 50 into the trough 41. The injector therefore functions similarly to the jet heater provided by the baffles 24, for increasing the temperature of the condensate prior to its return to one of the stages of the apparatus. This temperature may be further increased by providing a heat exchanger 52 receiving the heating mixture vented through the vent 48 and in turn having a vent 53 to the atmosphere.

The air mixture may be withdrawn from the vent condenser 39 through a vent connection 54 provided with a steam ejector 55 discharging into the auxiliary condenser 37 by means of which the heat of the ejector steam is recovered, the ejector cooperating with the vent condenser 39 to maintain the desired conditions of vacuum within the deaerating chamber.

In the embodiment of Figure 3, the apparatus is provided with heating trays 60, herein illustrated as being of the counter current flow type with the bottom tray 61 forming a partial partition between the heating stage and the pressure stage 62. Within the pressure stage, and below the water level therein may be provided a steam pipe 63 with a number of perforations 64, whereby steam may be bubbled upwardly through the water in intimate contact therewith. While the passage of steam through water is a more or less awkward way of obtaining intimate water and steam contact, the result is generally comparable to that heretofore obtained by the deaerating trays 5 of Figure 1 and the corresponding trays 33 of Figure 2. The air in the water in tending to establish a condition of pressure equilibrium with the negligible air content of the steam, passes into the steam bubbling therethrough and is carried upwardly together with the steam into the heating trays.

The water to be deaerated is supplied through a connection 65 communicating with a vent condenser 66 and discharging through a connection 67 into a water trough 68 from which it spills over the heating trays. The flow of water, as before described, is controlled by a valve 69 operated by a float 70 responsive to variations in the liquid level in the pressure stage.

The heating stage is vented through an offtake 71 to the vapor space of the vent condenser 66, which condenser in turn discharges its air content to the atmosphere through a vent 72. In order to relieve the apparatus of additional duties such as would be imposed thereon by the return of condensate at substantially condenser temperature or pressure, the connection 71, like the connection 72, is provided with baffles 73 constituting a jet or contact heater effective for bringing the condensate during its return into intimate contact with the vented mixture and correspondingly increasing its temperature.

With a deaerator of the character illustrated more particularly in Figure 3 involving a submerged steam inlet, it has been found that the question of water hammer particularly in starting up the apparatus is particularly objectionable. In order to obviate this condition, I may provide a steam connection 74 leading from the main steam supply into the pressure stage above the water level therein. This steam line may be provided with a controlling valve 75 by means of which the quantity of steam admitted above the water level may be regulated, and also by means of which a pressure differential may be maintained effective for keeping such an excess of pressure in the perforated steam pipe 63 as to overcome the hydrostatic head of the water. This makes it possible, if desired, to continuously supply some steam below the water level and other steam above the water level.

It will be apparent from the foregoing that each of the three types of apparatus herein shown by way of illustration only, is effective for taking condensate from a vent condenser cooperating with one stage of a deaerating apparatus, and increasing the temperature of such condensate before returning it to the desired stage of the apparatus. The advantages of the invention arise from such a temperature increase in the condensate whereby the apparatus itself is relieved from additional heating duty as heretofore imposed thereon.

While I have herein illustrated and described certain preferred embodiments of the present invention, it will be understood that changes in the construction and arrangement of the parts may be made without departing either from the spirit of the invention or the scope of my broader claims.

I claim:

1. An apparatus for deaerating water, comprising a chamber having a liquid space and a vapor space, a condenser supplied with a cooling water supply connection and operating to maintain substantially constant conditions of pressure within said vapor space, a connection for conveying condenser cooling water from the condenser to said chamber and including means for supplying additional heat to the heated water, means for controlling the supply of water in accordance with demands on said chamber for deaerated water, connections for conveying condensed vapors from said condenser to the apparatus at, and means in said connections for insuring raising of the condensate to a temperature higher than the temperature of the condenser.

2. An apparatus for producing substantially air-free water, comprising a temperature stage, a pressure stage, means for passing the water from the temperature stage to the pressure stage, a surface type vent condenser cooperating with and freely open to one of said stages, connections effective for continuously returning its condensate to such stage and means in said connections for insuring raising of the condensate to a temperature higher than the condenser temperature, and means for passing cooling water from the condenser to the temperature stage.

3. In an apparatus for producing substantially air-free water, a temperature stage, a pressure stage, means for supplying to said temperature stage heat in accordance with demands, means for passing the liquid first to the temperature stage and then to the pressure stage, a surface type vent condenser continuously cooperating with one of said stages, connections operative for returning the vent condenser condensate to said last mentioned stage in a substantially continuous manner and means in said connections for insuring raising of the condensate to a temperature higher than the condenser temperature.

4. In an apparatus for producing air-free water, a temperature stage of water treatment, a pressure stage of water treatment, a vent condenser cooperating with one of the stages, connections effective for delivering vent condenser condensate to the apparatus, a heater in said connections for raising the condensate to a temperature higher than condenser temperature, and means for supplying the water to be deaerated successively to said condenser, temperature stage and pressure stage.

5. In an apparatus for producing substantially air-free water, a heater constituting a temperature stage of water treatment constructed to supply heat to the liquid in accordance with the work being done therein, a receiver constituting a pressure stage and effective for receiving liquid from the temperature stage, a vent condenser having a condensate return cooperating with one of said stages and effective in substantially continuous manner for returning its condensate to the apparatus, and a heater for said return for raising the condensate to a temperature higher than the condenser temperature.

6. In an apparatus for producing substantially air-free water, a heater constituting a temperature stage of water treatment constructed to supply heat to the water in accordance with the work being done therein, a receiver constituting a pressure stage and effective for receiving liquid from the temperature stage, a vent condenser cooperating with one of said stages having a connection effective in a substantially continuous manner for returning its condensate to the apparatus, and contact heating means in said connection for raising said condensate to a temperature higher than condenser temperature, there being means for feeding the water to be deaerated successively to said vent condenser, temperature stage and pressure stage.

7. In an apparatus for producing substantially air-free water, an induction heater constituting a temperature stage of water treatment, a receiver adapted to receive heated liquid from said temperature stage and constituting a stage or pressure treatment for the heated liquid, a vent condenser continuously cooperating with one of said stages for maintaining substantially constant conditions therein, a condensate connection for returning condensate from the condenser to one of said stages, and means in said connection for insuring the raising of the temperature of the condensate prior to its delivery to the apparatus.

8. In an apparatus for producing substantially air-free water, a temperature stage, a pressure stage, a water supply communication between said stages, means for delivering the water to be deaerated first to the temperature stage and then through said communication to the pressure stage, means for supplying heating steam to the apparatus, the temperature stage comprising an open induction heater for bringing the steam and water into intimate contact and for controlling the amount of steam and heating of the water in the temperature stage to bring it to a temperature as high as possible in the presence of air therein, said pressure stage performing no substantial heating duty, a surface type vent condenser cooperating with and freely open to one of said stages, a condensate return from said condenser to one of said stages, and means for insuring increase of the temperature of the condensate during its passage through said connection.

9. An apparatus for producing substantially air-free water, comprising a temperature stage, a pressure stage, means for passing water from the temperature stage to the pressure stage, a surface type vent condenser having a continuously open vent, said condenser cooperating with and freely open to one of said stages, a condensate return connection from said condenser to one of said stages, and means for insuring the raising of the temperature of the condensate during its passage through said connection.

10. An apparatus for producing substantially air-free water, comprising a temperature stage, a pressure stage, means for passing water from the temperature stage to the pressure stage, a surface type vent condenser having a continuously open vent, said condenser cooperating with and freely open to one of said stages, a condensate return connection from said condenser to one of said stages, and contact type heating means in said connection for insuring the raising of the temperature of the condensate flowing therethrough.

11. An apparatus for producing substantially air-free water, comprising a temperature stage, a pressure stage, means for passing water from the temperature stage to the pressure stage, a vent condenser cooperating with and freely open to one of said stages, means for continuously discharging non-condensed vapors from the vent condenser, a condensate return connection between the vent condenser and one of said stages, and means for insuring the changing of the condensate temperature during its passage through said connection.

In testimony whereof I have hereunto set my hand.

WILLIAM S. ELLIOTT.